United States Patent [19]

McArdle

[11] Patent Number: 5,942,123

[45] Date of Patent: *Aug. 24, 1999

[54] METHOD OF USING A FILTER AID PROTEIN-POLYSACCHARIDE COMPLEX COMPOSITION

[76] Inventor: Blaise McArdle, 17 Leonard, Annisquam, Mass. 01930

[ * ] Notice: This patent is subject to a terminal disclaimer.

[21] Appl. No.: 08/779,455

[22] Filed: Jan. 7, 1997

Related U.S. Application Data

[63] Continuation-in-part of application No. 08/523,162, Sep. 5, 1995, Pat. No. 5,591,473.

[51] Int. Cl.[6] .................................................. B01D 37/02
[52] U.S. Cl. ........................... 210/674; 210/688; 210/777; 210/916; 426/422; 426/490; 426/495
[58] Field of Search ...................................... 210/663, 670, 210/688, 691, 694, 777, 778, 916, 674; 426/271, 422, 490, 495

[56] References Cited

U.S. PATENT DOCUMENTS

| | | | |
|---|---|---|---|
| 3,408,291 | 10/1968 | Thomas et al. | 210/665 |
| 3,680,700 | 8/1972 | Ryan | 210/777 |
| 3,884,804 | 5/1975 | Robinson et al. | 210/916 |
| 4,007,258 | 2/1977 | Cohen et al. | 424/22 |
| 5,324,351 | 6/1994 | Oshlack et al. | 106/153 |
| 5,356,467 | 10/1994 | Oshlack et al. | 106/153 |
| 5,645,880 | 7/1997 | McArdle | 426/327 |

*Primary Examiner*—Ivars Cintins

[57] ABSTRACT

The present invention relates to a method of manufacturing filtering aids, coagulants or clarifying agents, and odor suppressants and a using a protein-polysaccharide complex composition as a filtering aid, coagulant or clarifying agent, and odor suppressant for in the processing of fluids including gases and liquids to absorb a variety of separable components.

13 Claims, No Drawings

METHOD OF USING A FILTER AID PROTEIN-POLYSACCHARIDE COMPLEX COMPOSITION

CROSS-REFERENCE TO RELATED APPLICATIONS

This application is a continuation-in-part of a application Ser. No. 08/523,162 filed on Sep. 5, 1995, now U.S. Pat. No. 5,591,473.

FIELD OF THE INVENTION

This invention relates generally to uses of protein complex composition, specifically, to a protein-polysaccharide complex (PPC) composition including a water-soluble polysaccharide, a substantially water-insoluble protein and optionally an acidulant, as a filtering aid, an odor suppressant and as a coagulant or clarifying agent, and to methods of treating fluids therewith.

BACKGROUND OF THE INVENTION

There are numerous prior art treatments for filtration, clarification, coagulation and/or odor reduction of fluid streams. Previously used treatments of waste products such as sewage, plating solutions and the like, are inordinately expensive, and do not present a quick and efficient separation of insoluble metals or elimination of odors without creating additional pollutants. In the prior art one technology available for mitigation of waste streams involves precipitation of the heavy metals as the sulfide salt followed by decantation and filtration. It is an expensive operation, however, and requires constant attention by trained technical personnel.

U.S. Pat. No. 3,408,291 discloses the use of a regenerated cellulose containing precipitated sulfides of nickel, iron and zinc which are exchanged with metal ions such as cadmium, lead, mercury and silver to form insoluble sulfides of these metals. The regenerated cellulose is first treated either with arsenic or antimony which are soluble in regenerated cellulose as part of the step for subsequently forming the precipitated sulfides. Both arsenic and antimony, when subsequently exchanged during the ion exchange process, however, would be highly undesirable stream pollutants.

Also for example, deodorants such as masking agents and/or bacterial agents have been used for temporary relief from the odors. These treatments are expensive, are not permanent and need frequent applications, and do not actually eliminate the offensive gases but merely cover them up. Another known treatment process is the use of strong chemical oxidants such as lime water, potassium permanganate, chlorine, ozone, and sodium hypochlorite. While these chemicals are somewhat effective in eliminating odors, they are often corrosive to the equipment used and are themselves pollutants to the runoff water. Also, treatment of sewage, trade wastes and similar aqueous solutions to remove or separate colloidal, suspended and dissolved matter has proved to be expensive or inefficient. Similarly, raw materials of natural origin, such as diatomites, perlites, and cellulose, have been used as stabilizing and/or filtering aids for the filtration of liquids, especially beverages, to clarify or to separate off undesired solid particles or dissolved substances contributing to undesirable organoleptic characteristics. However, these materials have proven to be unsatisfactory.

Proteins or prolamines, such as zein, have many utilities due to their amphoteric nature. Proteins have been used in a wide variety of applications including in the production of paper coatings, grease-resistant coatings, laminated boards, solid color prints, printing inks, food coatings, and microencapsulants. Prolamines are substantially insoluble in water and in alcohol but are soluble in alcohol-water mixtures. It is desirable to produce and use these protein complexes in applications such as filtering aids, odor suppressants and as a coagulants or clarifying agents, in fluid, especially aqueous, environments to utilize the amphoteric characteristics of the protein components.

It is an object of the present invention to provide a method of processing fluids with fine to very fine protein-polysaccharide complex composition particles, to suppress odor or to clarify or to separate off undesired solid particles or dissolved substances often contributing to undesirable characteristics including organoleptic characteristics and contamination.

It is an object of the present invention to produce a water soluble complex containing both a substantially water insoluble protein and a polysaccharide displaying beneficial characteristics of both proteins and polysaccharides, useful as a coagulant or a clarifying agent, a stabilizing and filtering aid, and as a filter coating having predetermined or predictable physical or chemical properties suitable for specific purposes, so that it is possible, with structurally straightforward apparatus, to carry out qualitatively high value stabilizations, coagulations and separation filtrations.

It is an object of the present invention to provide a process for the production of a protein complex formed by impregnating or coating a polysaccharide with a substantially water-insoluble protein to form a coagulant or a clarifying agent, a stabilizing and filtering aid, and a filter coating.

It is an object of the present invention to provide a treatment process for the reduction of odors produced by sewage and the decomposition of animal wastes.

It is an object of the present invention to provide a treatment process for fuels to remove by filtration trace components such as magnesium that inhibit the complete combustion of the fuel.

Still other objects and advantages of the invention will in part be obvious and will in part be apparent from the specification.

SUMMARY OF THE INVENTION

The invention relates to the use of a protein-polysaccharide complex containing composition including at least one water-soluble polysaccharide and at least one substantially water-insoluble protein as a filtering aid, an odor suppressant and as a coagulant or clarifying agent, and to methods of treating fluids therewith. Methods of preparation of the composition and numerous methods of use are provided. The present invention relates to a method of filtering fluids by separating insoluble particles, including those having colloidal structures, out of the fluids, whereby various filter aid components are: dosed to the untreated fluid (unfiltered matter) for forming a filter cake by deposition; or are coated on or impregnated into a filter as a filter aid; thereafter, the solid matter particles are retained in the filter cake or in the filter as the fluid passes through the treated filter. The compositions of the present invention are particularly useful for clarifying, odor suppressing or filtering fluids such as beverages, waste streams, fuel streams, plating compositions, or similar liquids; specifically as an absorbent for waste water treatment; an absorbent for removing oil from water, soil or sand; an absorbent for removing trace impurities from fuels such as gasoline and propane; an odor suppressant in sewage treatment; and a beverage clarifying agent.

The invention is directed to the protein-polysaccharide complex composition of matter possessing the filtering or absorbing properties and the relationship of constituents; and the several steps in preparation of the composition exemplified in the methods hereinafter disclosed.

DETAILED DESCRIPTION OF THE PREFERRED EMBODIMENTS

The protein-polysaccharide complex compositions of the present invention useful as stabilizing agents and filtering aids include at least one water-soluble polysaccharide, at least one substantially water-insoluble protein and optionally, but preferably, an acidulant. The protein-polysaccharide complex (PPC) composition can be used as a filtering aid (either as a coagulant or a clarifying agent or as a coating on or impregnating into a filter) or as an odor suppressant,. These compositions are used as filtering aids, coagulants or clarifying agents in methods for filtering fluids by separating insoluble particles, including those having colloidal structures, out of the fluids, whereby various filter aids, coagulants or clarifying agents components are: dosed to the untreated fluid (unfiltered matter) for forming a filter cake by deposition; or are coated on or impregnated into a filter as a filter aid; thereafter, the solid matter particles are retained in the filter cake or in the filter as the fluid passes through the treated filter.

The present invention relates to a method of manufacturing filtering aids, coagulants or clarifying agents, and odor suppressants and to a method of using a protein-polysaccharide complex composition in the processing of fluids, including gases and liquids, to extract or separate a variety of separatable dissolved or undissolved components. The PPC coagulant, clarify agent and filtering aid of the present invention may be used to filter or to absorb a large variety of separatable metal components such as metals including lead from water supplies; silver, mercury, lead, copper and cadmium and other metals from spent plating solutions or aqueous industrial streams. In industry, for instance, it is desirable to recover silver from spent photo-processing solutions, and also for mitigation of waste stream pollution due to heavy metals in general.

The PPC filtering aid of the present invention may also be used to remove the malodorous constituents in sewage and in food products such as beverages, as well as to treat gases such as commercial propane and liquids such as gasoline to remove undesirable contaminants such as magnesium which inhibit the effectiveness of the combustion of these fuels.

Particularly noxious odors are caused by compounds which have a pronounced tendency to either donate or accept protons. Such compounds will hereinafter be referred to as "malodors." They include the olfactory notorious classes of lower carboxylic acids, thiols, thiophenols, phenols, lower amines, phosphines and arsines.

The PPC compounds are capable of effectively counteracting malodors when utilized in relatively small quantities and in many different mediums. For instance, use in room fresheners or room deodorants in the form of aerosols (sprays, etc.), liquids (wick type), solids (wax bases as in pomander, plastics, etc.), powders (sachets, dry sprays) and gels (solid gel sticks) are particularly preferred. Other illustrative uses are in clothes deodorants as applied by washing machine applications such as in detergents, powders, liquids, whiteners or fabric softeners or by other applications such as closet blocks, closet aerosol sprays, or clothes storage areas or in dry cleaning to overcome residual solvent notes on clothes; in bathroom accessories such as paper towels, bathroom tissues, sanitary napkins, towelettes, disposable wash cloths, disposable diapers, and diaper pail deodorants; in cleansers such as disinfectants and toilet bowl cleaners; in cosmetic products such as antiperspirant and underarm deodorants, general body deodorants in the form of powders, aerosols, liquids or solid, or hair care products such as hair sprays, conditioners, rinses, hair colors and dyes, permanent waves, depilatories, hair straighteners, hair groom applications such as pomade, creams, lotions, etc., medicated hair care products containing such ingredients as S-selenium-sulfide, coal tar, salicylates, etc., or shampoos, or foot care products such as foot powders, liquids or colognes, after shaves and body lotions, or soaps and synthetic detergents such as bars, liquids, foams or powders; in odor control such as during manufacturing processes, such as in the textile finishing industry and the printing industry (inks and paper); in effluent control such as in processes involved in pulping, stock yard and meat processing, sewage treatment, or garbage disposal, or in product odor control as in textile finished goods, rubber finished goods, car fresheners, etc.; in agricultural and pet care products such as dog and hen house effluents, and domestic animal and pet care products such as deodorants, shampoo or cleaning agents, or animal litter materials; in large scale closed air systems such as auditoriums, and subways and transport systems.

The amount of any such PPC composition to be utilized has been found to be independent, in general, of the particular malodors involved or components to be separated. The amount of PPC composition used, however, depends on the medium in which the PPC composition is used, the amount of component to be removed by the PPC composition by filtering or clarifying application, and often in gas fluid applications, the gas volume and gas circulation rate.

In general, such PPC composition are effective when present in a fluid(gas or liquid) containing the malodor or containing a component to be filtered or coagulated at PPC levels as low as 0.01 mg/cubic meter of gaseous fluid or 0.1 g/cubic meter of liquid fluid to be filtered. Of course, depending on the particular PPC compound used, some compounds are more active than others. Any concentration above this amount will generally be effective. However, from a practical point of view, more than about 10.0 to 20.0 g/cubic meter of fluid is probably unnecessary.

In accordance with one embodiment of the present invention there is provided a method for treating a watery mass containing animal, including human, wastes in order to reduce the odors produced by the degenerative breakdown of the animal wastes. The treatment method consists of mixing PPC composition with the watery excremental or organic waste material. The animal wastes may be restrained in any size or shape of trench, pit, aerating basin, clarifier, pond or lagoon. The PPC composition is added to the the watery mass in such containers in a sufficient quantity such that they would, if undisturbed, make a uniform layer a few grains deep over all of the surface of the watery material. Since there is a fairly uniform layer of the PPC composition covering the surface of the watery mass, this prevents odorous gases given off during the degeneration of the waste material from reaching the surrounding atmosphere. The deodorization takes place as the PPC composition first traps the odoriferous compounds formed in and released by the watery mass, trapping being accomplished as by adsorption on the surface of the PPC composition particles. The PPC composition preferably is dissolved in the aqueous liquid sewage or liquid manure thereby providing both odor control and enhancement of aerobic conditions for digestion by improving the capability of the treated solution to retain oxygen.

For the filtration of liquids, especially suspensions that contain solid matter, and dissolved or undissolved separable components, it is known to use in addition to the actual filter, for example the mechanical filter elements of a vessel filter, such as filter aids. In cases of suspensions containing a small amount of solid material, these filter aids are intended for facilitating the formation of a filter cake that is removable from the surface of the filter elements, or in cases of slimy solid matter, is intended to loosen up the very tight cake that is formed. The PPC filter aids produced according the present invention are added directly to the suspension that is to be filtered and are deposited to form a cake for the preliminary clarification of the unfiltered matter (deposition filtration). The PPC filter aids can be used alone or in combination with common filter aids such as cellulose, silica gel, diatomite, perlites, charcoal, wood dust, and similar materials.

The PPC compositions of the present invention can be coated onto a porous support or filter medium such as a paper filter or other porous or fibrous type filter medium simply by dissolving a PPC composition in water and dipping the filter into the PPC solution. These coated or impregnated filters are useful in a wide variety of separation processes as will be discussed and exemplified herein.

The protein-polysaccharide complex (PPC) composition of the present invention includes a water-soluble polysaccharide, a substantially water-insoluble protein, and optionally, but preferably, an acidulant.

The polysaccharides are water-soluble, and if used to produce a product for human or animal consumption, are generally recognized as safe (G.R.A.S.) by the U.S. Food and Drug Administration. In general, the water-soluble polysaccharides are plant-derived polysaccharides and related materials such as pectin. Examples of polysaccharides that can be used to prepare the PPC composition include, but are not limited to water-soluble cellulose derivatives, seaweed polysaccharides such as alginate and carrageenin, seed mucilaginous polysaccharides, complex plant exudate polysaccharides such as gum arabic, tragacanth, guar gum, pectin, ghatti and the like, and microbially synthesized polysaccharides such as xanthan gum. In a preferred embodiment, the polysaccharides are guar gum, pectin, gum arabic and mixtures thereof.

The polysaccharide preferably is present in an amount ranging between about 90% to 99.5% by weight of the total PPC composition, preferably in an amount ranging between about 95% to 99% by weight of the total PPC composition. The total PPC composition is defined as the total weight of the protein and polysaccharide components.

Similarly, the protein can be any protein that is predominately or substantially water-insoluble, however, vegetable proteins are advantageously utilized due to their availability. In general, the vegetable protein is a prolamine. A prolamine is a cereal-derived protein that is insoluble in water, absolute alcohol or neutral solvents and soluble in dilute (80%) alcohol. Suitable examples of prolamines include, but are not limited to, corn-derived prolamine or zein, barley-derived prolamine or hordein and wheat-derived prolamine or gliadin.

The substantially water-insoluble protein is present in an amount ranging between about 0.5% to 10% by weight of the total PPC composition, preferably in an amount ranging between about 1% to 5% by weight of the total PPC.

In a preferred embodiment of the invention, the vegetable protein or prolamine used in the composition is zein or corn gluten. Zein is extracted from corn or maize. PPC compositions containing zein are used to form odorless, tasteless, clear, hard and almost invisible films.

Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight. Of the eight amino acids that are necessary for protein synthesis in the human body, zein has virtually no lysine or tryptophan.

Zein is extracted from corn gluten by physical separation means as opposed to chemical separation means. Whole corn zein contains a heterogeneous mixture of disulfide linked aggregates. Commercial extraction results in a product with a molecular weight of 25,000 to 35,000. Zein contains a high proportion of hydrocarbon group side chains and has a high percentage of amide groups present with a relatively low amount of free carboxylic acid groups.

Relatively small amounts of organic acids or acidulants are used to lower the pH of the aqueous polysaccharide solutions during preparation of the PPC compositions. The acidulants enhance the water dispersibility of the PPC compositions, i.e. to facilitate reconstitution of the protein-polysaccharide complex compositions in water.

Relatively small amounts of a pH adjusting compound in the form of an acid or an acidulant are preferably used to lower the pH of the aqueous polysaccharide solutions during preparation of the PPC compositions to between 1 to 11.5, preferably about 3.8 to 8.5. The acidulants enhance the water dispersibility of the PPC compositions, thereby facilitating reconstitution of the protein-polysaccharide complex compositions in water. Although any pH adjusting acidic compound is useful in the present invention, including inorganic acids such as carbonic acid, sulfuric acid, hydrochloride acid and the like, it is preferable to utilize organic acids, preferably $C_1$ to $C_{20}$ organic acids. Suitable organic acidulants include, but are not limited to, citric acid, malic acid, adipic acid, tannic acid, lactic acid, ascorbic acid, acetic acid, fumaric acid and the like and mixtures thereof. In a preferred embodiment, citric acid is used.

The acidulants are used in an amount between about 0.25% to 5% by weight of the total PPC compositions, preferably in an amount between about 0.5% to 1% by weight. The acidulant is preferably added to the water of an aqueous organic solvent system prior to addition of the organic component.

A PPC composition is prepared by dissolving the substantially water-insoluble protein or prolamine in an aqueous organic solvent system containing the acidulant to form a protein solution. The soluble polysaccharide is then added to the protein solution to form a protein-polysaccharide complex in solution. The solvent is separated or evaporated from the solution to yield the final protein-polysaccharide complex (PPC) composition.

The aqueous organic solvent system is a mixture containing at least one organic solvent in water. Suitable organic solvents include, but are not limited to, alcohols such as ethyl alcohol and isopropyl alcohol; edible glycols such as propylene glycol and certain polyethylene glycols; and, ketones such as acetone. In a preferred embodiment of the invention, the aqueous organic solvent system is either aqueous ethyl alcohol or aqueous isopropyl alcohol. Alcohols generally can hold up to six grams of zein in solution for each 100 milliliters of alcohol.

The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. More preferably, the amount of water in such systems is between about 25% to 35% and the amount of alcohol is between about 65% to 75%.

The substantially water-insoluble protein or prolamine is added to the aqueous organic solvent system in an amount between about 100 and 300 grams of prolamine per liter of aqueous organic solvent system, more preferably in an amount between about 120 to 240 grams per liter. The dissolution is carried out at a temperature between about 20° C. (ambient room temperature) and about 60° C., preferably about 30° C. using conventional agitation methods to form a protein solution. Soluble polysaccharide in minute fiber or particulate form is then admixed with the protein solution to form a PPC in solution.

In an alternative embodiment, a protein containing gluten such as corn gluten can be directly added into the aqueous organic solvent system instead of pure zein thus passing the zein protein portion of the gluten into solution while the deprotenated non-zein remainder of the gluten can be separated by vacuum filtering or other standard separation techniques. An incidental amount of up to 100%, preferably up to 10% by weight of deprotenated gluten can be present in the recovered in admixture with the protein-polysaccharide complex without adversely affecting the properties of the complex.

The PPC in solution generally contains between about 90% to 99.5% of polysaccharide and between about 0.5% to 10% of a protein based on the combined total weight of the polysaccharide and the protein. More preferably, the PPC in solution contains between about 95% to 99% of polysaccharide and between about 1% to 5% of vegetable protein based on the total weight of polysaccharide and protein.

It is important that the substantially water-insoluble protein or prolamine thoroughly impregnate the soluble polysaccharide particles during the process of admixing the soluble polysaccharide with the protein solution. The aqueous organic solvent system used to prepare the protein solution should wet the soluble-polysaccharide particles so that the hydrophilic soluble polysaccharide particles are impregnated or coated with the hydrophobic protein to form the PPC solution.

The admixing process is carried out until a complete uniform mixture is attained. In general, the process is carried out at a temperature between about 20° C. and 60° C., preferably between about 20° C. and 25° C. for a time period of between about 10 and about 30 minutes, preferably between about 10 and 15 minutes. The PPC solution is agitated during the admixing process by conventional agitation methods including, but not limited to, manual shaking, mechanical shaking, magnetic stirring, mechanical stirring or a combination thereof.

Additives that promote impregnation may be added at any point during the admixing process. Suitable additives include, but are not limited to, detergents and emulsifiers. Exemplary additives are polysorbates, edible vegetable oils and egg albumin.

Dispersibility and film forming characteristics of the PPC composition can be modified by adding up to 5%, preferably 0.125% to 5%, by weight of particulate metal oxides or sulfides containing metals from Periodic Table Groups 4 to 13, preferably Groups 8 to 10, most preferably any valent form of iron oxide and iron sulfide. These metal oxides or sulfides can be added to the initial solvent system to admix with the PPC composition during formation or be subsequently added to and mixed with the dry powdered PPC composition.

The PPC solution or powder may additionally contain one or more additives at a total level of up to 20% by weight of the combined polysaccharide and protein components of the PPC composition including chelating agents, sulfides, fillers, pigments, stabilizers, thickening agents, buffers, $SiO_2$, drilling muds, borax and mineral salts depending on its application of specific use. Particularly useful fillers include: chelating agents such as organic acids useful in chelating free metals, as well as sulfides useful in complexing free metals.

Once the PPC solution has been prepared, the solvent is separated or evaporated to yield a protein-polysaccharide complex composition, that is, particulate polysaccharide impregnated or complexed with a protein. Any number of solvent removal techniques may be used including, but not limited to, vacuum drying, centrifugation, evaporation, freeze drying, air drying, convection oven drying or a combination thereof.

It is preferred that the solvent removal technique be one that does not require the use of excessive or prolonged heat that will oxidatively darken the product. Although oxidative darkening has little effect on the utility of the product it may affect its appeal and desirability. One preferred method of extracting the solvent is vacuum drying which safety removes and recovers the solvent while drying the product to provide the PPC composition.

The protein-polysaccharide complex composition provided in accordance with the invention can be further processed by grinding or milling to a desired mesh particle size for use in tablets, granules, powders, pellets, extrusions, flours and the like. The dried PPC composition is preferably added to the water in an amount ranging between about 2 to 50 grams per gallon of water, preferably in an amount between about 2 to 10 grams per gallon. The PPC composition is thoroughly dispersed in the water by mixing, for example, with a mechanical stirrer to form a homogeneous dispersion.

In a preferred embodiment, the PPC composition can be coated onto a porous support or filter medium such as a paper filter or other porous or fibrous type filter medium simply by dissolving a PPC composition in water and dipping the filter into the PPC solution. The PPC composition is then allowed to dry on the filter surface by evaporation of the water from the solution.

In another embodiment, the previously described porous support means is a tubular filter cartridge. The filter element can also include wound layers of yarn or a similar strand material, such as nylon, orlon, polypropylene, cotton and the like. The coating step is preferably accomplished by dipping or spraying the tubular filter element in or with a PPC solution to produce a PPC-coated filter layer of between 1/16 and 2 inches thick, preferably 1/8 to 1 inch thick, and most preferably between 1/8 to 5/8 inch thick.

The PPC filter aid material referred to above is preferably coated on or impregnated into any suitable commercial porous or fibrous filter substrate, preferably made from synthetic or cellulose fibers. Suitable synthetic fibers are polyethylene, including high-density polyethylene, polypropylene, halogenated polyethylenes, polyoxymethylene, and polyamide fibers. It is desirable to form a precoat filter layer on these or any suitable commercial filter element of between about 0.00025 and 1.0 grams per square foot of filter surface, preferably 0.00025 and 0.0025 grams of PPC per square foot of filter.

Additional filter aid materials that may be incorporated into the PPC filter systems of the present invention are well known in the art and include cellulose fibers, diatomaceous earth, carbonaceous adsorbents such as charcoal, expanded perlite, asbestos fibers and polyacrylonitrile fibers. Particularly useful filter aids have heretofore been described as fillers and include: chelating agents such as organic acids well known in the art as being useful in chelating free metals, and sulfides well known in the art as being useful in complexing free metals.

A further inventive procedural technique for stabilizing, clarifying or filtering liquids such as beverages, especially beer, juice, wine, utilizing stabilizing and/or filtering aids, that in particular are produced pursuant to the described inventive method, can be inventively achieved utilizing cake filters in that the stabilizing and/or filtering aids are disposed in on or more filter columns, and in particular in up to 10 filter columns, in such a way that a certain quantity of the unfiltered material is conveyed through one of the columns until this column has used up to about 80% of its adsorption capacity. Thereafter, the stream of unfiltered material is conveyed into another reclaiming column until again about up to approximately 80% of the adsorption capacity thereof has been used up, whereby in this manner gradually all of the not yet used up, i.e. regenerated, columns that are present are continuously connected into the circuit, while simultaneously the already used-up columns are similarly continuously regenerated one after the other.

In summary, it is to be noted that with the present invention PPC, can be used as non-polluting, inexpensive filtering aids and/or stabilizing aids, coagulants and clarifying agents or as odor suppressants. PPC filter aids produced pursuant to the present invention lead to considerable improvement of operation during cake filtration, especially during the stabilization of beverages to avoid turbidity. Extremely advantageous is the fact that specifically heavy particles and specifically lighter particles no longer separate or dissociate in the filter material, as was previously the case, for example, for components of aluminum and polyethylene. The uniform mixing density and homogeneity ensure use for practically all fields, but especially for use as filter material and/or for cake filtration. Finally, by appropriate composition of the components and control of the process steps, it is possible to produce filtering aids of prescribed size and permeability useful in a wide variety of applications.

It is also possible to regenerate precoat filter layers on porous supports by delivering a solution containing a protein-polysaccharide complex composition through said precoat filter layer, while said precoat filter layer remains on said support means. The filter is then allowed to dry and is ready for reuse. However in many circumstances it may be desirable to employ single use filter, especially in the treatment of food beverages such as coffee and wine.

The following examples of preparation of the PPC composition are presented for purposes of illustration only and are not to be construed to limit the scope of the invention described herein.

EXAMPLE A

A 10% zein solution was prepared by dissolving 10 grams of zein (Freeman Industries, Inc.) in 90 grams of an aqueous isopropyl alcohol solution. The aqueous isopropyl alcohol solution contained 15% water by weight and 85% isopropyl alcohol by weight. Dissolution was carried out in a 500 ml beaker and the solution was initially stirred using a mechanical stirrer at a speed of over 100 rpm in order to fully wet the zein. Once all of the zein was dispersed, the stirring speed was reduced by about ½ for an additional five minutes to insure complete dissolution of the zein in the aqueous isopropyl alcohol solution. The ambient temperature was maintained at 22° C. throughout this procedure. Accordingly, a protein solution was provided.

Two hundred grams (200 g) of milled guar gum powder (fine—60 mesh, TIC GUMS, Belcamp, Md.) was slowly added to the protein solution with vigorous stirring using a mechanical stirrer at a speed of over 100 rpm. Manual stirring was started as the mixture thickened. Additional aqueous isopropyl alcohol was added as needed to attain a soupy appearance indicative of successful impregnation of the soluble guar gum particles by the zein solution. Agitation of this soupy liquid mixture was maintained for fifteen minutes.

The resulting PPC solution was dried under reduced pressure of 0.05 atmospheres. at a temperature of 60° C. using a lab-line Duo-Vac vacuum oven manufactured by LabLine Corp., Melrose Park, Ill. The resulting dried PPC composition was a yellowish-beige color and was milled to a granular form (80 mesh).

EXAMPLE B

A soupy PPC solution containing was prepared as described in Example A. After addition of the guar gum was complete, 20 grams of dried egg albumin (Henigson, Inc., White Plains, N.Y.) was added and dispersed completely. The solution was dried under reduced pressure at 60° C. using a Lab-Line Duo-Vac vacuum oven. The resulting PPC composition was a yellowish-beige color and was milled to a granular form.

EXAMPLE C

Fifty grams (50 g) of citric acid was added to 0.675 kg of water used to prepare 4.5 kg of an 85:15 isopropyl alcohol:water aqueous organic solvent system. Five hundred grams of zein was added to the aqueous organic solvent system in a suitable vessel. The aqueous organic solvent was kept in motion during the addition with the aid of a mechanical stirrer. Accordingly, a solution of 10% by weight of zein in aqueous alcohol was prepared.

Nine and one-half kg of guar gum was added to the 10% zein solution with mixing in a Stokes Heavy Duty sigma-type blender. After about 30 minutes of continuous mixing, the mass was homogeneous, slightly tan and had a wet, sand-like consistency. The mass was dried in an explosion-proof drier to yield a protein-polysaccharide complex.

EXAMPLE D

The procedure of Example A was followed, however 1.5 grams of iron oxide (FeO) (Harcros high moment iron oxide TB5600—lot F4122, Easton, Pa.) was mixed per each 10 grams of zein contemporaneously with the addition of the guar gum. The iron oxide/PPC mixture was not recovered from the solution but 4405.3 ml containing approximately 2516.5 grams of PPC was directly mixed into a 250 gallon gravity spray applicator filled with water.

EXAMPLE 1

A solution of 5 grams of PPC as prepared in Example C in 2,000 ml of water was prepared. Into the solution a paper filter measuring 2⅜ inch×3³⁄₁₆ inch manufactured by Star Market Co, Cambridge, Mass. 02138, was dipped for 5 seconds and then removed. The impregnated filter was then washed with tap water and dried in an over at 98° F.

Two pots of coffee were made using Folgers regular "Mountain Grown" following the manufacturer's instructions. The coffee in one pot was made with the PPC impregnated filter and the coffee in the other pot was made using an untreated filter. The coffee was allowed to stand at room temperature for 24 hours and then tasted. The coffee made using the untreated filter tasted rancid and spoiled, while the coffee made with the PPC impregnated filter tasted rich and freshly brewed.

EXAMPLE 2

A solution of 10 grams of PPC(as prepared in Example C) was prepared in 4,000 ml of water. Into the solution a paper filter manufactured by Star Market Co, Cambridge, Mass., 02138 was dipped for 5 seconds and then removed. The impregnated filter was then dried in an oven for ½ hours at 83° F.

The PPC impregnated filter was placed over the opening of a glass jar. An identical filter that was not impregnated with PPC was placed over the opening of a second jar. To each jar 250 ml of American Chardonnay was introduced (bottled by Northern State Vineyards, Batavia, N.Y. 14202—containing sulfite—alcohol by volume 11%) by decanting the wine through each filter. The jars were sealed and allowed to stand for 20 days. The jars were then opened and the wines were tested for flavor.

The Chardonnay that was filtered by the untreated filtered smelled like vinegar, displayed a sour taste and upon analyzation contained 20 parts per million of lead. The Chardonnay that has been passed through the PPC impregnated filter displayed delicate bouquet and taste, and upon analyzation displayed no lead content or presence of sulfites.

EXAMPLE 3

Five grams of PPC(as prepared in Example A), 5 grams of citric acid and 5 grams of ascorbic acid were blended thoroughly into 2,000 ml of water at 500 rpm's for twenty minutes. To this solution was added 2 grams of sodium bicarbonate which was blended in by hand. The resulting mixture was allowed to stand for 10 hours until the liquid was clear.

Into the mixture was dipped a fiber filter measuring 2⅜ in.×3³⁄₁₆ in. manufactured by Star Market Co, Cambridge, Mass. 02138. After 5 seconds the filter was removed from the solution and washing in clean tap water until residual PPC was removed. The filter was then vacuum dried.

The mouths of two sterile containers were fitted with filters. One container held the PPC impregnated filter. The other container was supplied with an untreated filter of the same size and manufacture. Identical solutions of water containing 32 parts per million of lead were passed through the two filters. The solution passing through the filter that had been impregnated by the PPC solution was analyzed and contained no lead. The solution passing through the filter that had not been impregnated was analyzed and untreated filter removed none of the lead from the solution.

EXAMPLE 4

Two in-line gas filters (Briggs #394358 USA) were washed on 100 ml of gasoline. The first filter (A) was immersed in unleaded fuel (87 octane) for one hour until the filter was completely saturated with fuel. The first filter was then dried with compressed air and kept for 24 hours at room temperature. The second filter (B) was immersed in a mixture of 100 ml of unleaded fuel (87 octane) and 0.5 grams of PPC (as prepared in Example A) for one hour until the filter was completely saturated with fuel. The second filter was then dried with compressed air and kept for 24 hours at room temperature.

Filter A was attached to the fuel line of a DYNA 10,000 Watt generator powered by a 16 hp Briggs air cooled gas engine having two thousand ml of 87 octane unleaded fuel in the fuel tank. Recorded running time for the engine commenced on first full ignition. During the run, the throttle was set at 4,000 RPMs while a 1 hp electric motor was allowed to draw a current of 1800 watts from the generator. During the running time of the generator it was noted that fumes were generated directly behind the engine emissions area thereby indicating incomplete combustion of the fuel. It was also necessary to adjust the throttle of the generator at four separate times to maintain the proper RPMs of the engine. The generator ran out of gas after running for 37 minutes 12.04 seconds.

The engine fuel system was cleared of fuel by compressed air and filter B was attached to the fuel line of the DYNA 10,000 Watt generator powered by the same 16 hp Briggs air cooled gas engine. Two thousand ml of 87 octane unleaded gasoline was poured into the fuel tank of the engine. Running time for the engine commenced on first ignition. In accordance with the procedure using filter A, during the run of the engine with filter B, the throttle was set at 4,000 RPMs while a 1 hp electric motor was allowed to draw a current of 1800 watts. During the running of the generator no emission fumes were noticeable and it was not necessary to adjust the throttle during the testing period. The generator ran out of gas after running for 44 minutes, 33.007 seconds.

EXAMPLE 5

Two fiberglass reinforced paper air filters measuring 3¾" in height, O.D. $4_{1/2}$", I.D. 2" were treated in the following manner. Filter A was immersed in plain tap water for 5 seconds, removed from the water, vacuum dried and then stored for 24 hours at 110° F. Filter B was immersed for 5 seconds in 2,000 ml of tap water that had been premixed with 5 grams of PPC (as prepared in Example A). Filter B was then removed from the solution, vacuum dried and stored for 24 hours at 110° F.

A metal canister was fitted to a ten foot propane gas hose to allow for the replacement of the filters. The gas line was then fitted to the main feed hose of an 850,000 BTU direct pressure hot air balloon heater which was attached to two 100 pound sequenced direct feed propane tanks(#1 and #2). Both tanks #1 and #2 contained eighty pounds of propane. The tanks were placed into the basket of a 78,000 cubic foot Northstar hot air balloon manufactured by Letter Loan, Ltd., Clovabilty, Ireland. The balloon was then inflated using a portable fan and hand held burner until the internal temperature of the balloon was elevated to 175° F.

Filter A was fitted into the cannister and the 850,000 BTU burner was ignited. The balloon was lifted on a tether maintaining a temperature of 196° F. throughout the test period using gas from tank #1.

It was noted that the burning color of the propane an ignition showed blue and green highlights indicating incomplete combustion. The height of the flame was 12.6 ft. The balloon had sustained lift for an hour and twenty seven minutes.

Filter A was removed from the metal canister. The line was cleared of gas and tank #2 was switched on line. The temperature of the balloon was then stabilized at 175° F. for 10 minutes. Filter B was fitted into the canister and the 850,000 BTU burner was ignited. The balloon was lifted on a tether maintaining a temperature of 196° F. throughout the test period using gas from tank #2.

Upon ignition the color of the main flame was white indicating superior combustion. Fewer recharges of heat were required and it was difficult to maintain the balloon temperature to 196° F. as temperatures exceeded 210° F. even when flow from the tank was reduced by 20%. The height of the flame was 16 ft. The balloon had sustained flight for two hours and thirty nine minutes.

EXAMPLE 6

Ten grams of dry PPC composition made according to the procedure of Example C, additionally having #10 screen sized gluten particles remaining in the dried PPC composition, were placed on a plastic column to make a PPC filter for ordinary salt water.

Two tanks were prepared to hold 12,000 ml of water. Tank A contained 12,000 ml of sea water prefiltered through the plastic column holding the PPC filter aggregates. Tank B contained 12,000 ml salt water strained though an ordinary 2 micron paper filter. Both tanks were maintained at room temperature. Into each tank was placed a healthy lobster weighing 400 grams.

After one hour in the tanks, the lobster in tank B died, however the lobster in tank A remained alive. The dead lobster was removed from the tank and was weighed to display a 31 gram weight loss. The water in tank B was analyzed for magnesium, known as a deoxyfying agent, and a normal level of magnesium found in sea water was present.

After five hours the lobster in tank A was fed 10 grams of fresh salmon. After ten hours the lobster was removed from tank A and weighed. The lobster weight had remained unchanged at 400 grams.

A sample of the sea water from tank A was analyzed and no traces of magnesium were observed.

EXAMPLE 7

In Largo, Fla. a one thousand gallon sewage holding tank positioned along a sewage treatment stream contained sewage that emitted a strong smell of sulfur. The sewage in the holding tank was treated by mixing into the sewage 100 grams of PPC as prepared in Example C. The sewage in the holding tank gradually passed into a sewage treatment stream into holding tanks further down stream The site was visited several times over a period of 24 hours to observe any change in conditions at the holding tank, and at points in the sewage stream above and below the holding tank.

After both six and twelve hours after treatment with PPC, the treated holding tank displayed no smell of sulfur. In the holding tanks containing sewage at points along the sewage stream one mile and one half mile above the testing site the sulfur odor was acute in both tanks. At a similar holding tank at a point below the treated holding tank along the sewage stream the sulfur odor was greatly reduced.

After 24 hours after treatment with PPC, the treated tank gave off only a slight odor of sulfur. Tanks located above the treated tank continued to give off acute sulfur odors. Tanks containing sewage located in the sewage stream below the treated tank demonstrated a greatly reduced odor of sulfur.

EXAMPLE 8

Two identical sewage slurry tanks A and B, each tank having a volume of 20,000 gallons, were filled to capacity with cow waste in the form of liquid manure and allowed to stand for a period of 72 hours.

The contents of tank A were treated with lime and were agitated by a 5 hp 3½" line pump for two hours. The contents of tank B were mixed with 5,000 grams of PPC as prepared in Example B and agitated by a 3½" line pump for 30 minutes.

The manure-like odor emanating from tank A was not diminished by the treatment with lime. Subsequently, when the liquid cow manure in tank A was sprayed by pump lines into a nearby field, the field maintained a noticeable unpleasant odor for 23 consecutive days.

The manure-like odor emanating from tank B was completely diminished after treatment with PPC and the remaining odor of the waste displayed a smell of freshly mown grass. When the liquid manure from tank B was sprayed by pump lines into a separate field, there was no noticeable unpleasant odor. On each visit back to the field for 23 days no significant noticeable unpleasant odor.

EXAMPLE 9

Salt water extracted from a coastal well located in Gloucester, Mass., was passed through a Polyguard-CR cartridge filter (Millipore Corp. of Bedford, Mass.) having a pore size of 0.1 $\mu$m and autoclaved for ten cycles of 30 minutes. The recovered salt water was used to form an 85:15 isopropyl alcohol: water aqueous organic solvent system for the preparation of a PPC composition in accordance with the procedure of Example C.

Ten grams of the salt water produced PPC was dissolved in 4,000 ml of fresh water and into the mixture was dipped a fiber filter measuring 2⅜ in.×3³⁄₁₆ in. manufactured by Star Market Co, Cambridge, Mass. 02138. After 5 seconds the filter was removed from the solution and washed in sterile water until residual PPC was removed. The filter was then oven dried.

The mouths of two sterile containers were fitted with filters. One container held the PPC impregnated filter. The other container was supplied with an untreated filter of the same size and manufacture. Identical solutions of water having a noticeable odor of sulfur and a "rotten egg" taste attributable to the presence of sulfur were passed through the two filters. The solution passing through the filter that had been impregnated by the PPC solution displayed no odor of sulfur and "rotten egg". The solution passing through the filter that had not been impregnated was analyzed and untreated filter displayed both a definite odor of sulfur and a "rotten egg" taste.

The PPC compositions provided in accordance with the above examples are useful in a variety of utilities including as a food preservative, a carrier for pharmaceuticals, an absorbent for waste water treatment, a surfactant to emulsify oil preparations or to control foaming characteristics of anionic and cationic surfactant blends, a carrier for inorganic compounds including metal oxides, an absorbent for removing oil from water, sand or soil, an odor suppressant, a soil stabilizing agent, a dye carrier, a herbicide, a clarifying agent or a plasticizer for polymers, a stabilizer and adhesion promoter for cement and asphalt compositions and an adhesive promoter for binding particulates including silica in polymers including natural and synthetic rubbers.

It will thus be seen that the objects set forth above, among those made apparent from the preceding description, are efficiently attained and, since certain changes may be made in the described product, and in carrying out the above process, and in the construction set forth without departing from the spirit and scope of the invention, it is intended that all matter contained in the above description shall be interpreted as illustrative and not in a limited sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. A process for treating a liquid to remove undesirable impurities or components contained in the liquid comprising:

contacting a liquid containing undesirable impurities with a clarifying or filtering effective amount of a filtering aid comprising a protein-polysaccharide complex composition comprising between about 90% to 99.5% by weight of a water-soluble polysaccharide impregnated with between about 10% to 0.5% by weight of a substantially water-insoluble protein to purify or clarify the liquid, separating the liquid and the filtering aid and recovering a purified or clarified liquid.

2. The process of claim 1 further comprising providing a porous support means; precoating the porous support means with the filtering aid to form a precoat filter layer substantially coextensive with the porous support means; and contacting the liquid with said precoat filter layer by passing said liquid through said porous support means at a rate sufficient to remove undesirable impurities contained in the liquid.

3. The process of claim 2 wherein the precoat filter layer further includes a carbonaceous adsorbent.

4. The method of claim 2 wherein the precoat filter layer is present in an amount of between about 0.00025 and 1.0 grams per square foot of filter surface.

5. The method of claim 2 further comprising the step of regenerating said precoat filter layer by delivering a solution containing a protein-polysaccharide complex composition through said precoat filter layer, while said precoat filter layer remains on said support means.

6. The process of claim 1 wherein the liquid is coffee.

7. The process of claim 1 wherein the liquid is wine.

8. A method of filtering metals from fluid streams containing metals comprising the steps of:

contacting a fluid containing a metal or a metal salt with a clarifying or filtering effective amount of a filtering aid comprising a protein-polysaccharide complex composition comprising between about 90% to 99.5% by weight of a water-soluble polysaccharide impregnated with between about 10% to 0.5% by weight of a substantially water-insoluble protein to purify or clarify the fluid, separating the fluid and the protein-polysaccharide complex composition and recovering a purified or clarified fluid.

9. The method of claim 8 further comprising providing a porous support means; precoating the porous support means with the filtering aid to form a precoated filter layer substantially coextensive with the porous support means; and contacting the fluid with said precoated filter layer by passing said fluid through said porous support means at a rate sufficient to remove filterable metal contained in the fluid.

10. The method of claim 8 wherein the metal or metal salt containing fluid contacted with the filtering aid comprises a fluid fuel.

11. A method for reducing malodors emanating from fluid containing compositions comprising: contacting a fluid containing composition having an eminating malodor with an odor reducing effective amount of a protein-polysaccharide complex composition comprising between about 90% to 99.5% by weight of a water-soluble polysaccharide impregnated with between about 10% to 0.5% by weight of a substantially water-insoluble protein to substantially reduce the malodors emanating from the fluid.

12. The method of claim 11 wherein the fluid containing composition is sewage.

13. The method of claim 11 wherein the fluid containing composition is liquid manure.

\* \* \* \* \*